United States Patent [19]
Derecktor

[11] Patent Number: 5,848,743
[45] Date of Patent: *Dec. 15, 1998

[54] VEHICLE ROOF RACK

[75] Inventor: Thomas E. Derecktor, Fall River, Mass.

[73] Assignee: TracRac, Inc., Fall River, Mass.

[*] Notice: This patent issued on a continued prosecution application filed under 37 CFR 1.53(d), and is subject to the twenty year patent term provisions of 35 U.S.C. 154(a)(2).

[21] Appl. No.: 704,121

[22] Filed: Aug. 28, 1996

[51] Int. Cl.⁶ .................................................. B60R 9/04
[52] U.S. Cl. ........................... 224/331; 224/322; 224/324
[58] Field of Search ..................................... 224/322, 323, 224/324, 329, 330, 331, 321, 319, 316

[56] References Cited

U.S. PATENT DOCUMENTS

| | | |
|---|---|---|
| 3,229,994 | 1/1966 | Klein . |
| 3,368,488 | 2/1968 | Bronson .................................. 224/331 |
| 3,406,728 | 10/1968 | Rost . |
| 3,677,451 | 7/1972 | Burland ............................... 224/330 X |
| 3,762,763 | 10/1973 | Deshores . |
| 3,901,548 | 8/1975 | Seaman, Jr. . |
| 3,931,919 | 1/1976 | Gerber et al. ............................ 224/324 |
| 4,215,894 | 8/1980 | Sidlinger . |
| 4,341,247 | 7/1982 | Price . |
| 4,398,763 | 8/1983 | Louw . |
| 4,527,786 | 7/1985 | Hsu . |
| 4,527,827 | 7/1985 | Maniscalco et al. . |
| 4,650,383 | 3/1987 | Hoff . |
| 4,778,092 | 10/1988 | Grace ..................................... 224/331 |
| 4,864,941 | 9/1989 | Goulter . |
| 4,969,784 | 11/1990 | Yanke . |
| 4,974,898 | 12/1990 | Baranski . |
| 5,002,324 | 3/1991 | Griffin . |
| 5,052,739 | 10/1991 | Irwin . |
| 5,067,535 | 11/1991 | Wolff . |
| 5,137,320 | 8/1992 | Christensen . |
| 5,139,375 | 8/1992 | Franchuk . |
| 5,143,415 | 9/1992 | Boudah . |
| 5,152,570 | 10/1992 | Hood . |
| 5,190,337 | 3/1993 | McDaniel . |
| 5,203,603 | 4/1993 | Hertzberg et al. . |
| 5,238,280 | 8/1993 | Christensen . |
| 5,301,726 | 4/1994 | Wojcik . |
| 5,303,858 | 4/1994 | Price . |
| 5,310,238 | 5/1994 | Wheatley . |
| 5,316,190 | 5/1994 | Bullock . |
| 5,393,114 | 2/1995 | Christensen . |
| 5,443,554 | 8/1995 | Robert . |
| 5,456,397 | 10/1995 | Pedrini ................................... 224/324 |
| 5,458,268 | 10/1995 | Hill ....................................... 224/324 |
| 5,494,327 | 2/1996 | Derecktor . |

FOREIGN PATENT DOCUMENTS

| | | |
|---|---|---|
| 834050 | 5/1960 | United Kingdom ................... 224/331 |
| 2 276 114 | 9/1994 | United Kingdom . |

Primary Examiner—Renee S. Luebke
Attorney, Agent, or Firm—Salter & Michaelson

[57] ABSTRACT

A vehicle roof rack includes a track having an elongate tubular body with a thin wall which defines substantially the entire outer perimeter of the tubular body. The thin wall has a top wall section with an upwardly opening channel formed therein and a top wall section opposite the bottom wall section. The roof rack further includes a pair of support brackets for supporting the track in an elevated position above the roof of the vehicle. Each support bracket has a pair of fasteners for releasably attaching the support bracket to the track and a pair of hook elements for releasably attaching the support brackets to a gutter of the vehicle. At least one sliding fastening assembly is releasably attachable to the upwardly opening channel of the top wall section of the track. The sliding fastening assembly includes a member slidably mounted on the top wall section of the track and movable along the length of the channel, and a pair of fasteners for securing the member at a desired position along the length of the channel.

4 Claims, 6 Drawing Sheets

FIG. 10   FIG. 11   FIG. 12

VEHICLE ROOF RACK

BACKGROUND AND SUMMARY OF THE INVENTION

This invention relates generally to roof racks, and more particularly to a roof rack which is securely attached to the roof of a vehicle having a rain gutter.

Roof racks that are attached to gutters provided along opposite sides of a roof of a vehicle, such as an automobile or van, are well-known in the art. This invention relates generally to a vehicle roof rack that is particularly light-weight and sturdy in construction.

Among the several objects of the present invention are the provision of an improved vehicle roof rack having sliding connections for releasably and adjustably attaching different accessories thereon, such as tie down members and ski mounts, in order to accommodate a variety of transport needs; the provision of such a vehicle roof rack which is sturdy in design and light-weight; the provision of such a vehicle roof rack which can maintain a 500 pound load thereon; the provision of such a vehicle roof rack which can be easily installed on and removed from the roof of a vehicle; the provision of such a vehicle roof rack which is capable of being installed on any size and model van; the provision of such a vehicle roof rack which does not damage the vehicle to which it is attached; the provision of such a vehicle roof rack which is easy to manufacture and durable in use; and the provision of such a vehicle roof rack that has an attractive appearance.

In general, the present invention is directed to a vehicle roof rack for attachment to the roof of a vehicle, such as a van. The roof rack comprises a track having an elongate tubular body comprising a thin wall which defines substantially the entire outer perimeter of the tubular body. The thin wall has a top wall section with an upwardly opening channel formed therein and a top wall section opposite the bottom wall section. The roof rack further includes support means for supporting the track in an elevated position above the roof of the vehicle. The support means has means for releasably attaching the support means to the track and means for releasably attaching the support means to the roof of the vehicle. A sliding fastening assembly is releasably attachable to the upwardly opening channel of the top wall section of the track. The sliding fastening assembly comprises a member slidably mounted on the top wall section of the track and movable along the length of the channel, and means for fastening the member at a desired position along the length of the channel.

More specifically, the channel of the top wall section of the track is generally rectangular in cross section and has a pair of inwardly extending lips that define a slot in communication with the channel therebetween. The means for fastening the member of the sliding fastening assembly comprises a bolt fastener having a head portion disposed within the channel of the track and captured therein by the pair of inwardly extending lips and a threaded portion extending through an opening of the member, and a mating nut fastener that is threadably received by the threaded portion of the bolt fastener to fasten the member in place.

The support means of the present invention comprises a bracket having a first, generally horizontally disposed wall for engaging the track when attaching the track thereto, and a second downwardly depending wall that extends from the first wall. The means for releasably attaching the support means to the track comprises a downwardly opening channel formed in the bottom wall of the track, a bolt fastener having a head portion disposed within the downwardly opening channel and a threaded portion extending through an opening formed in the first wall of the bracket, and a mating nut fastener that is threadably received by the threaded portion of the bolt fastener for releasably attaching the bracket to the track. The bottom wall section of the track has a second shallow channel formed therein and the first wall of the bracket has an upwardly facing surface with a longitudinal rib formed therein. When assembled, the rib is received in the second shallow channel of the track. The shallow channel and the rib are defined by a pair of shoulders formed in the bottom wall section of the track, and a pair of shoulders formed in the first wall of the bracket, respectively. The shoulders of the rib are disposed between and engaging the shoulders of the bottom wall section of the track for preventing any relative lateral movement between the track and the bracket.

The means for releasably attaching the support means to the roof of the vehicle comprises a hook element having a formation for releasably securing one end thereof to the second wall of the bracket and a finger portion at its other opposite end for engaging a gutter provided along a long side of the roof of the vehicle. The second wall of the bracket has a peripheral edge seated within the gutter of the vehicle, a flange portion that extends generally perpendicularly from the second wall, and an aperture formed in the second wall between the flange portion and the peripheral edge. The formation of the hook element has a threaded bore extending therethrough, and the means for releasably attaching the support means to the gutter comprises a bolt fastener that extends through an opening formed in the flange portion of the second wall and is threadably received by the formation of the hook element for clamping the bracket to the gutter. In this position, the hook element extends through the aperture formed in the second wall of the bracket from one side of the second wall to its opposite side.

Other objects, features and advantages of the invention shall become apparent as the description thereof proceeds when considered in connection with the accompanying illustrative drawings.

BRIEF DESCRIPTION OF THE DRAWINGS

In the drawings which illustrate the best mode presently contemplated for carrying out the present invention.

Corresponding reference numerals designate corresponding parts throughout the several views of the drawings.

DETAILED DESCRIPTION OF THE PREFERRED EMBODIMENTS

Figure 1:
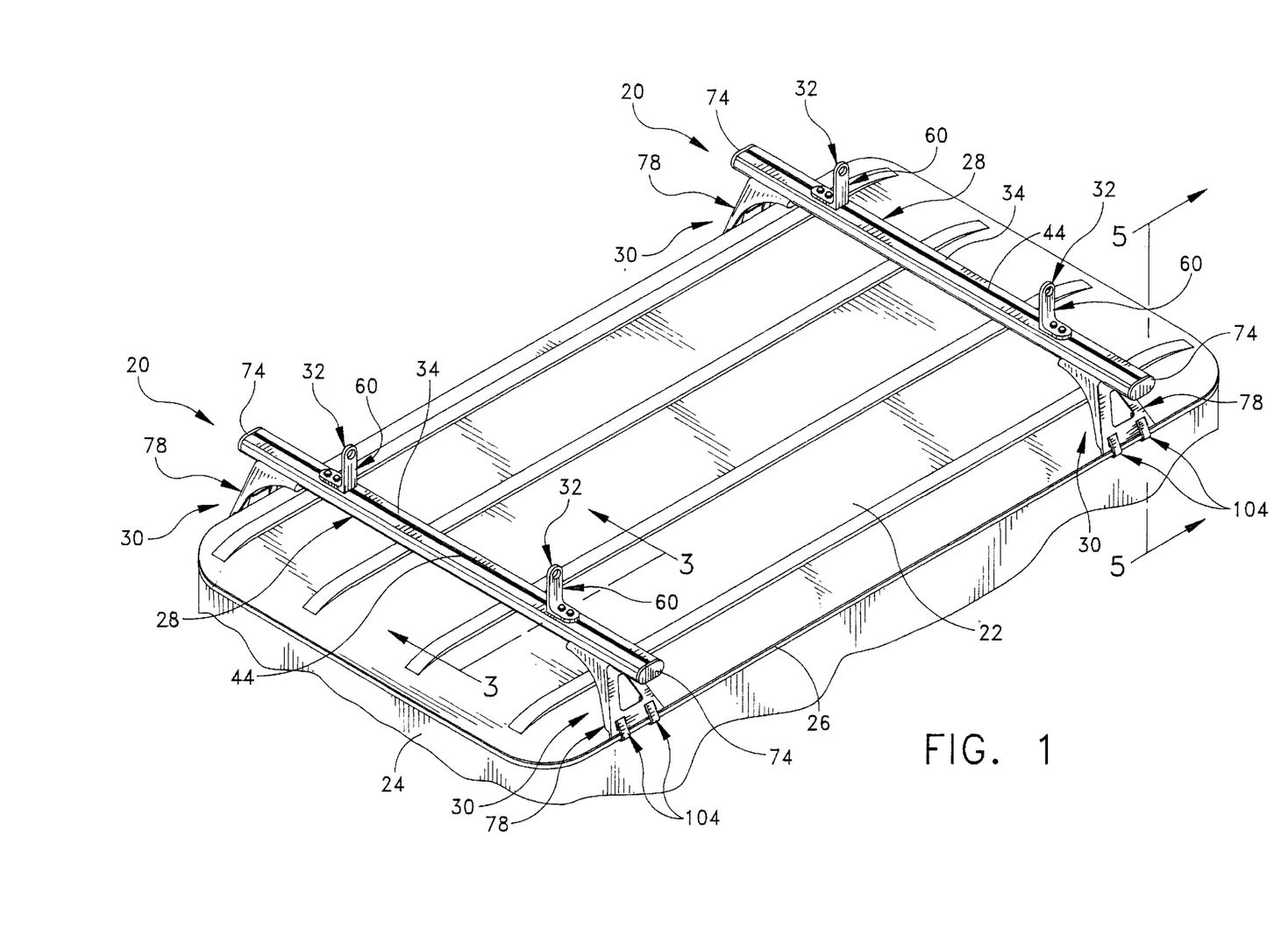
FIG. 1 is a top perspective view of a vehicle roof rack of the present invention mounted on the roof of a vehicle.

Referring now to the drawings, and more particularly to FIG. 1, a pair of vehicle roof racks of the present invention, each generally indicated at 20, are releasably mounted on a roof 22 of a vehicle 24 (e.g., a van, automobile or the like). As shown, the vehicle 24 has a pair of oppositely positioned, parallel gutters 26 formed along opposite sides of the roof of the vehicle in the well-known manner. Each roof rack 20 is adapted to be releasably mounted on these gutters 26 so that it spans across the width of the vehicle 24. The roof racks 20 operate with one another so that articles requiring transportation may be positioned on the roof 22 of the vehicle 24 and securely attached thereto. Such articles can be skis, building supplies, bicycles, and the like.

Figure 2:
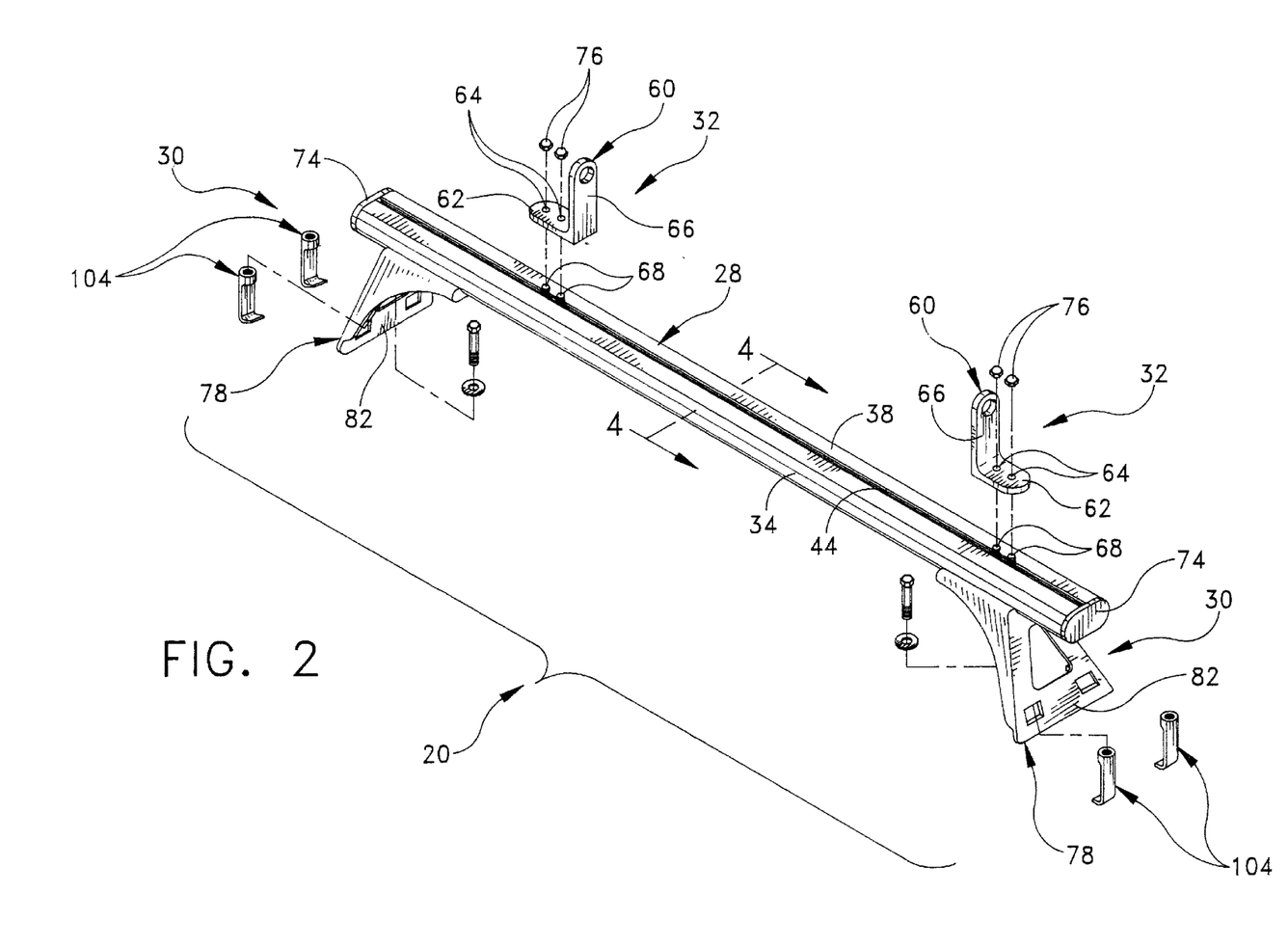
FIG. 2 is an exploded perspective view of the roof rack.
Figure 3:
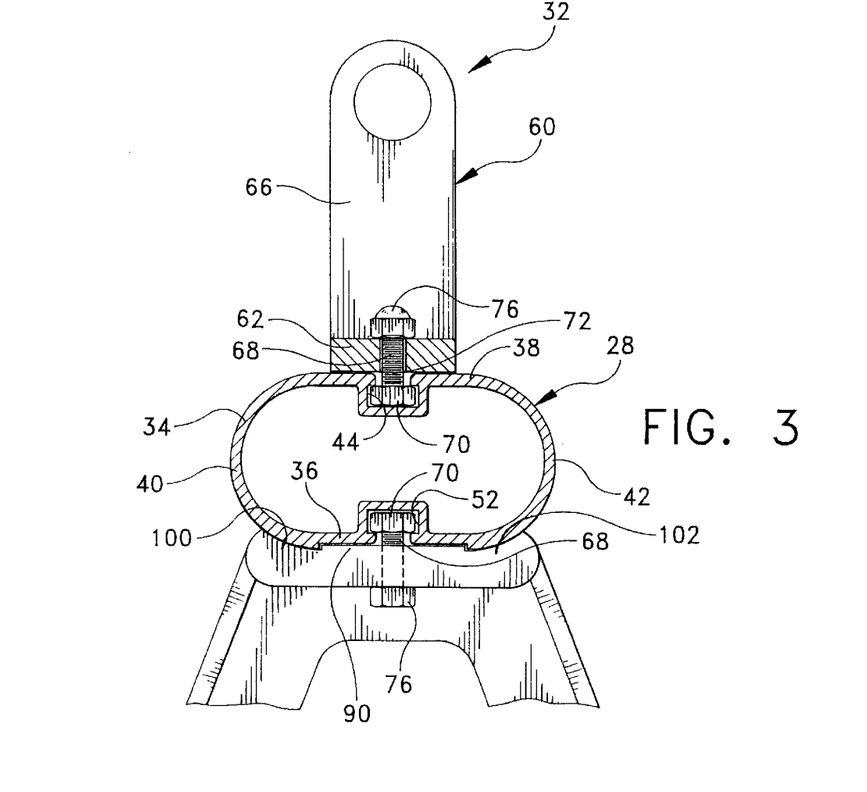
FIG. 3 is an enlarged cross-sectional view taken along line 3—3 of FIG. 1.
Figure 4:
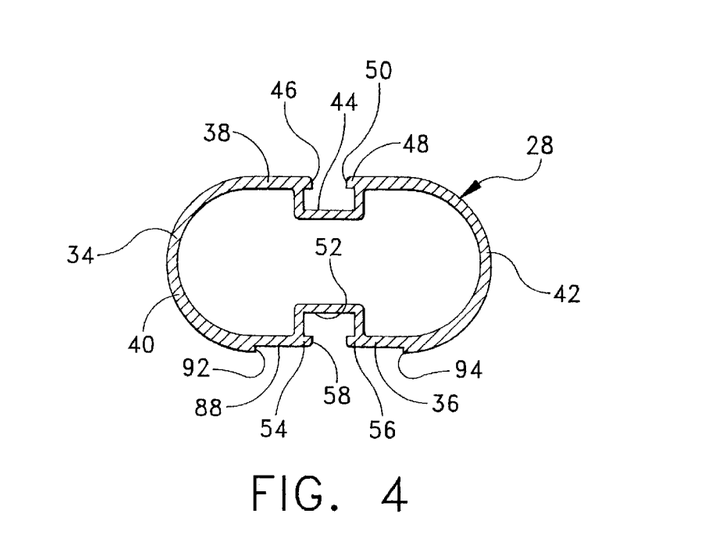
FIG. 4 is an enlarged cross-sectional view taken along line 4—4 of FIG. 2.

Turning now to FIGS. 2–4, each roof rack 20 comprises an elongate track, generally indicated at 28, a pair of supports, each generally indicated at 30, for securing the track 28 to the roof 22, and at pair of sliding fastening assemblies, each generally indicated at 32, for securing articles to the track 28. The track 28 has an elongate tubular body 34 comprising a thin wall which defines substantially the entire outer perimeter of the tubular body. The tubular nature of the track 28 of the roof rack 20 enables it to withstand substantial amounts of torsional and lateral loads applied thereto by the items being carried by the roof rack.

Referring to particularly to FIGS. 3 and 4, the tubular body 34 includes a bottom wall section 36, a top wall section 38 opposite the bottom wall section, and a pair of side wall sections 40, 42 which interconnect the bottom and top wall sections. Integrally formed in the top wall section 38 is an upwardly opening channel 44 that is rectangular in cross section. A pair of inwardly extending lips 46, 48 define a slot 50 therebetween, the slot 50 being in communication with the channel 44. Similarly, the bottom wall section 36 has an integrally formed, downwardly opening channel 52 that is also rectangular in cross section. The channel 52 of the bottom wall section 36 also has a pair of inwardly extending lips 54, 56 that define a slot 58 therebetween in communication with the channel. Preferably, the track 28 is fabricated from extruded aluminum which has been found to be light-weight, easy to manufacture and strong in construction. However, the track 28 can also be made from materials other than aluminum exhibiting the characteristics of aluminum (e.g., strong, light-weight).

Each sliding fastening assembly 32 releasably attaches to the upwardly opening channel 44 of the top wall section 38 of the track 28. More specifically, the sliding fastening assembly 32 comprises an accessory or member generally indicated at 60 which is slidably mounted on the top wall section 38 of the track 28 and movable along the length of the track. As shown, the member 60 is a tie down member and has an L-shaped body with a horizontal leg 62 having a pair of openings 64 formed therein, and a vertical leg 66 extending up from the horizontal leg 62. This particular tie down member 60 is for securing long items (e.g., lumber, tubing and the like) to the roof racks 20. It should be understood that members having different configurations suitable for securing other items to the roof racks 20 (e.g., skis, bicycles, etc.) may be provided and still fall within the scope of the present invention. Their attachment to the track 28 would be achieved in the same manner as member 60, which will be described in greater detail below.

For securing the member 60 to the track 28, a pair of bolt fasteners 68 of standard construction (e.g., a machine bolt) are provided. Each bolt fastener has a head portion 70 disposed within the channel 44 of the track 28 and captured therein by the pair of inwardly extending lips 46, 48, and a threaded portion 72 that extends upwardly from the head portion 70. The bolt fasteners 68 are inserted into the channel 44 at one of the open ends of the track 28. It should be observed in FIG. 1 that a pair of end caps, each indicated at 74, for each roof rack 20, are provided for enclosing the open ends of the track 28 and thus preventing the removal of the bolt fastener 68 from the track. However, prior to the complete assembly of the roof rack 20, the ends of the track 28 are left open so that items such as the bolt fasteners 68 can be inserted into the channels 44 (and 52) of the track. The end caps 74 can be of the type that are locked onto the track 28 so as to prevent their unwanted removal from the track.

A pair of mating nut fasteners 76 (e.g., hex nut) are provided for securing the member 60 to the track 28. As shown, each nut fastener 76 has a threaded opening (not designated). The openings 64 formed in the horizontal leg 62 of the member 60 are sized for receiving the threaded portions 72 of the bolt fasteners 68 therethrough while head portions 70 are captured by the pair of inwardly extending lips 46, 48. Once each bolt fastener 68 is inserted through its respective opening 64, the threaded portion 72 of the bolt fastener 68 is threadably received by the nut fastener 76, each bolt fastener 68 being inhibited from rotating since the side walls (not designated) forming the sides of the channel 44 engage the head portion 70 of the bolt fastener 68. Thus, by rotating the nut fastener 76, the member 60 is clamped and secured into place upon tightening of the nut fastener. It should be noted that since the channel 44 extends continuously along the length of the track 28, the member 60 can be located anywhere along its length. The member 60 can be removed from the track 28 by simply untightening the nut fastener 76 until the threaded portion 72 of the bolt fastener 68 disengages the nut fastener 76.

Figure 6:
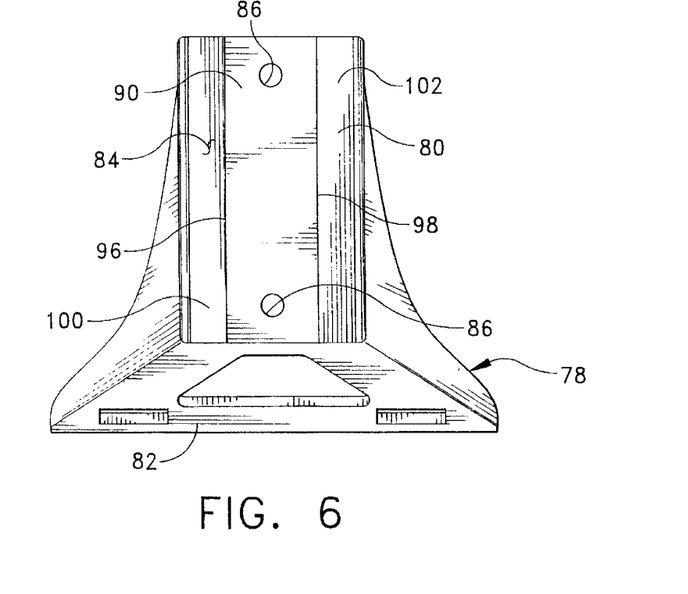
FIG. 6 is a top plan view of a bracket of the roof rack.
Figure 7:
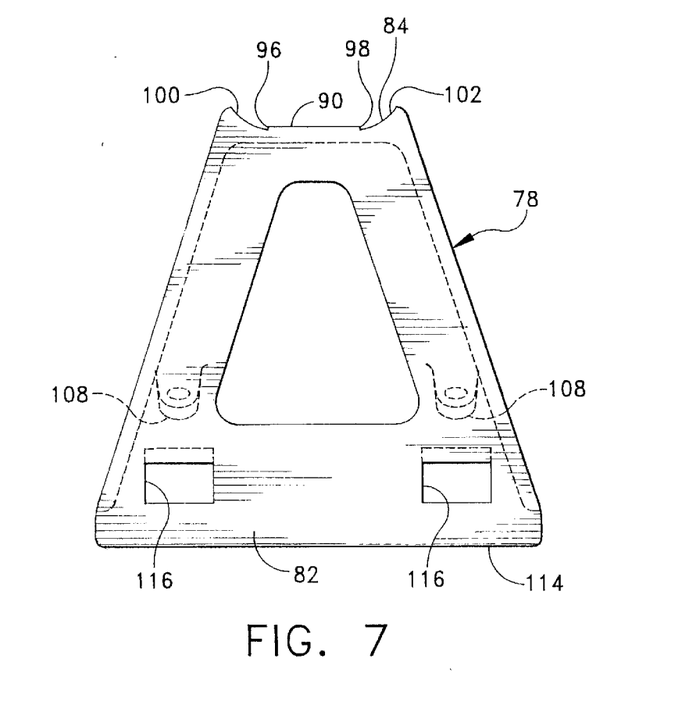
FIG. 7 is a front elevational view thereof.
Figure 8:
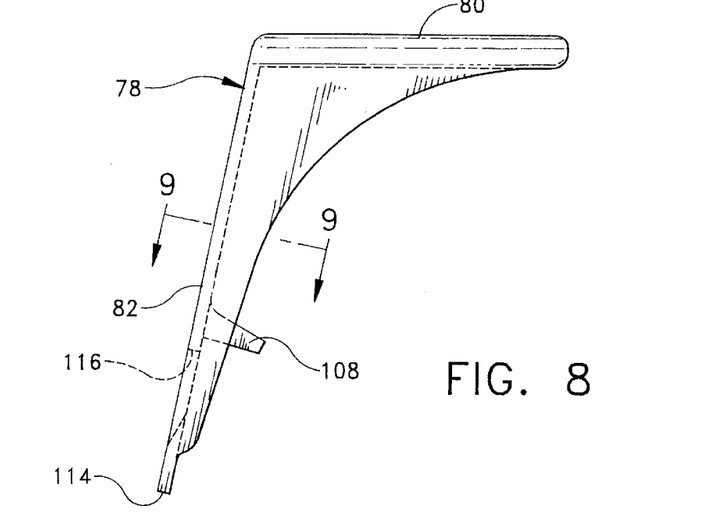
FIG. 8 a side elevational view thereof.
Figure 9:
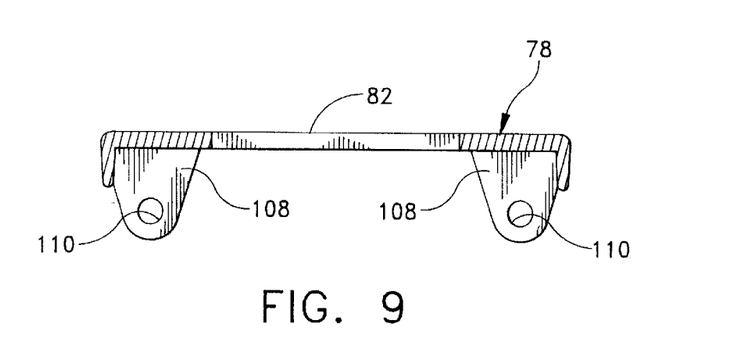
FIG. 9 is a cross-sectional view taken along line 9—9 of FIG. 8.

Still referring to FIGS. 2–4, and to FIGS. 6–9, the attachment of the track 28 to the support 30 is similar to the attachment of the member 60 to the track 28. As shown, each support 30 includes a bracket generally indicated at 78 having a first, generally horizontally disposed wall 80 for engaging the track 28 when attaching the track thereto, and a second downwardly depending wall 82 that extends from the first wall 80 at an angle slightly greater than ninety degrees (see FIG. 8). Turning briefly to FIG. 6, the first wall 80 of the bracket 78 has an upwardly facing surface 84 and a pair of openings 86 formed therein for securing the first wall of the bracket to the track 28.

More specifically, another bolt fastener, also designated 68, is disposed within the other channel 52 of the track 28 and captured therein by the pair of inwardly extending lips 54, 56. This bolt fastener 68 is also inserted into the channel 52 at one of the open ends of the track 28. Another nut fastener, also designated 76, is provided for securing the track 28 to the first wall 80 of the bracket 78. The openings 86 formed in the first wall 80 of the bracket 78 are each sized for receiving the threaded portion 72 of the bolt fastener 68 therethrough. For each bolt fastener 68, once inserted through the opening 86, the threaded portion 72 is threadably received by the nut fastener 76. By rotating and tightening the nut fastener 76, the track 28 is clamped and secured into place on the first wall 80 of the bracket 78. Lateral adjustment of the track 28 with respect to the bracket 78 is achieved by the continuous extension of the channel 52 along the track 28.

As illustrated in FIGS. 3 and 4, the bottom wall section 36 of the track 28 has a second shallow channel 88 formed therein. The upwardly facing surface 84 of the first wall 80 of the bracket 78 has a longitudinal rib 90 formed therein. This rib 90 is received in the second channel 88 of the track 28 when mounting the track 28 on the first wall 80 of the bracket 78. More specifically, the second channel 88 is defined by a pair of shoulders 92, 94 that are formed in the bottom wall section 36 of the track 28. The rib 90 is defined by a pair of shoulders 96, 98 that are formed in the first wall 80 of the bracket 78. The arrangement is such that the shoulders 96, 98 of the rib 90 are disposed between, and engage the shoulders 92, 94 of the bottom wall section 36 of the track 28 for preventing any relative lateral movement between the track and the bracket. As shown, the lateral edge margins 100, 102 of the upper surface 84 of the first wall 80 are curved upwardly so that they mate with the lateral edge margins (not designated) of the bottom wall section 36.

Figure 5:
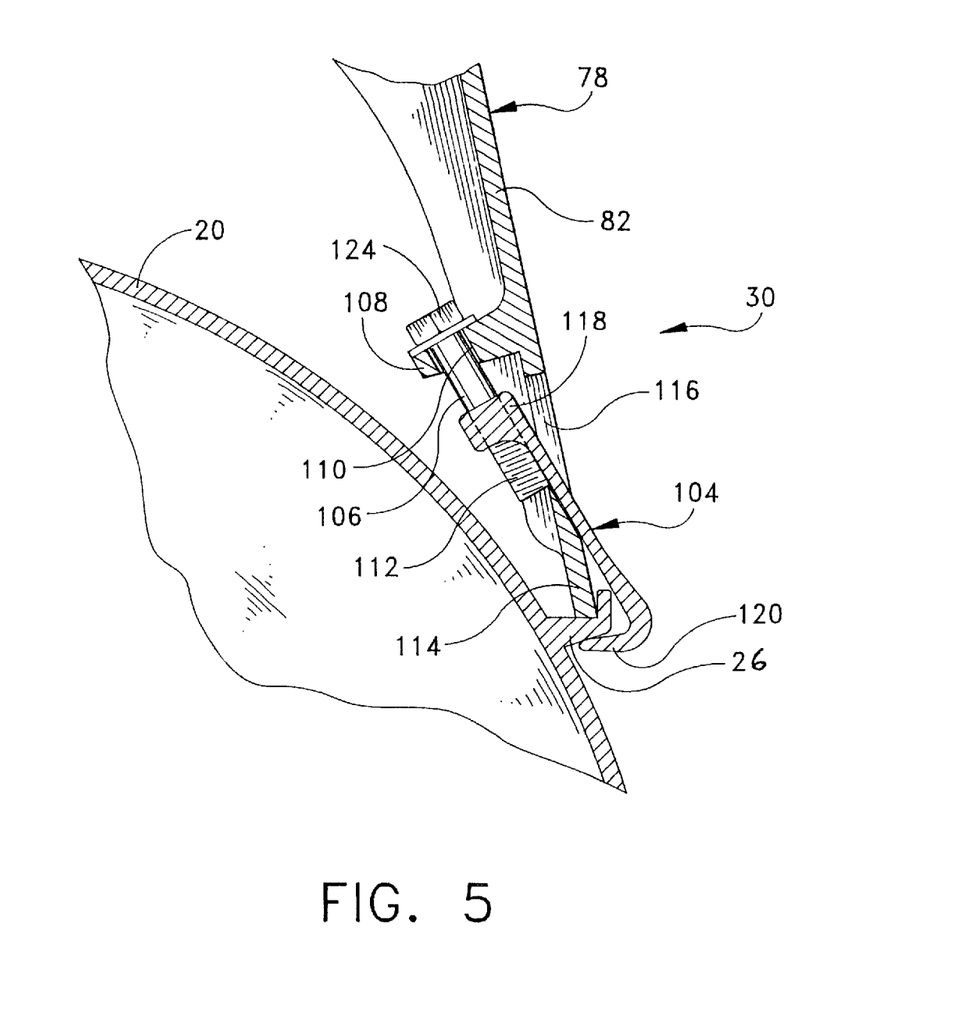
FIG. 5 is an enlarged cross-sectional view taken along line 5—5 of FIG. 1.

Referring now to FIGS. 5–12, and more particularly to FIGS. 5–9, there is illustrated a hook element, generally indicated at 104, which releasably attaches the bracket 78 to the gutter 26 of the vehicle 24 via a machine bolt 106. As shown, the inner surface (not designated) of the second wall 82 of the bracket 78 has a pair of flange portions, each indicated at 108, that extend generally perpendicularly away from the second wall 82. Each flange portion 108 has a clearance opening 110 formed therein that is sized to receive a threaded portion 112 of the machine bolt 106 therethrough. Disposed between the lower peripheral edge 114 of the second wall 82 and each flange portion 108 are a pair of apertures 116 that receive the hook element 104 therethrough when mounting the bracket 78 onto the gutter 26 of the vehicle 24. As shown in FIG. 5, the hook element 104 extends through its respective aperture 116 formed in the second wall 82 from one (outer) side of the second wall to its opposite (inner) side. Preferably, the bracket 78 and the hook element 104 are fabricated from a suitable aluminum alloy having adequate strength characteristics.

It should be noted that the construction by which the roof rack 20 is attached to the roof 22 of the vehicle may be varied depending upon whether the vehicle has gutters. In vehicles that do not have gutters, the brackets can be configured in any suitable manner known in the art to achieve this attachment and still fall within the scope of the present invention.

Figure 10:
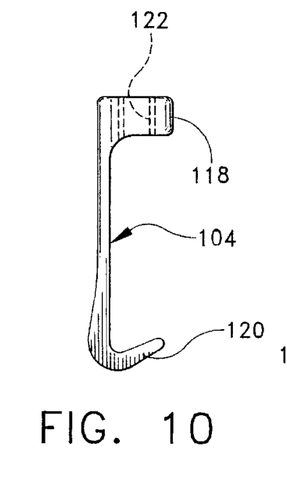
FIG. 10 is a side elevational view of a hook element of the roof rack.
Figure 11:
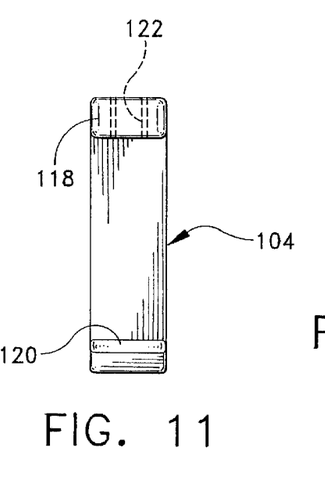
FIG. 11 a front elevational view thereof.
Figure 12:
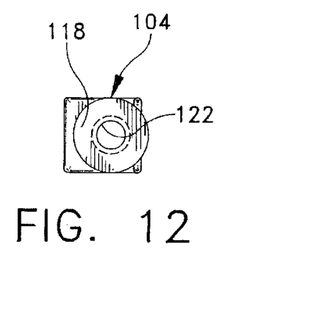
FIG. 12 is a top plan view thereof.

Referring now to FIGS. 10–12, each hook element 106 has a formation 118 at one end thereof for securing the hook element to the second wall 82 of the bracket 78 via the machine bolt 106 and a finger portion 120 at its other opposite end for engaging the gutter 26 of the vehicle 24. The formation 118 of the hook element 104 has a threaded bore 122 extending therethrough that threadably receives the threaded portion 112 of the machine bolt 106. The arrangement is such that the machine bolt 106 extends through the clearance opening 110 of the flange portion 108 in such a position that a head portion 124 of the machine bolt 106 engages the flange portion 108. The machine bolt 106 is threadably received by the formation 118 of its respective hook element 104, and when tightened, clamps the bracket 78 to the gutter 26.

Referring back to FIG. 5, the lower peripheral edge 114 of the second wall 82 of the bracket 78 rests within the gutter 26 and is prevented from being removed from the gutter by the upwardly flared end section (not designated) of the gutter 26. Preferably, the lower edge 114 is coated with polymeric or rubber material for preventing any damage to the vehicle 22 caused by the bracket 78. The finger portion 120 of the hook element 104 engages the gutter 26, and by tightening the machine bolt 106, the clamping force of the hook element 104 on the second wall 82 of the bracket 78 is increased. The finger portion 120 is also preferably coated with resilient material for protecting the gutter 26. This manner of attachment produces a strong connection between the roof rack 20 and the gutter 26 of the vehicle 24.

It should be observed that the vehicle roof rack 20 of the present invention can be mounted on any type of vehicle having a pair of gutters similar to the gutters 26 depicted throughout the drawings. The assembly of each roof rack 20 is as follows. First, after mounting the desired accessory (e.g., members 60) onto the track 28 in the manner described above, the first wall 80 of each bracket 78 is connected to the track 28 in such a manner that the bracket is capable of sliding along the length of the track. The lower peripheral edges 114 of each bracket 78 is placed within the gutter 26 in the manner illustrated in FIGS. 1 and 5. The machine bolts 106 are next inserted through the flange portions 108 of each bracket 78 whereupon the threaded end portions 112 of the machine bolts 106 are threadably received by the formations 118 of the hook elements 104. The machine bolts 106 are tightened until the brackets 78 are securely mounted on the gutters 26.

Next, the track 28 is fixedly attached to the supports by tightening the nut fasteners 76. It should be observed that for each bracket 78, there are two bolt fasteners 68 and two nut fasteners 76. If the accessory (e.g., member 60) requires lateral adjustment, it can be accomplished at this time, or prior to the mounting of the roof rack 20 on the vehicle 24.

It should be noted that the tubular nature of the track 28 of the present invention provides a strong connection between the member 60 and the track for mounting items on the roof rack 20. It should also be noted that the sliding connection of the members 60 enable the easy attachment to, adjustment of, and removal of the members to the track 28 of the roof rack 20 without any loss of strength or durability.

Furthermore, the bracket 78 and the hook elements 104 interengage with one another and the gutter 26 so that a single force vector which determines the precise clamping angle for the hook is achieved. The hook element 104 and the bolt fastener 106 are in pure tension which eliminates the need for additional fasteners which are commonly present on other prior art van racks. Preferably, the lower edge 114 of the bracket 78 is seven inches wide for increasing the securement of the attachment of the bracket to the gutter 26.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A vehicle roof rack for attachment to a roof of a vehicle, said roof rack comprising:

a track having an elongate tubular body comprising a thin wall which defines substantially the entire outer perimeter of the tubular body, said thin wall having a bottom wall section and a top wall section opposite the bottom wall section, said top wall section having an upwardly opening channel formed therein;

support means for supporting the track in an elevated position above the roof of the vehicle, said support means having means for releasably attaching the support means to the track and means for releasably attaching the support means to the roof of the vehicle;

a sliding fastening assembly releasably attachable to the upwardly opening channel of the top wall section of the track, said sliding fastening assembly comprising a member slidably mounted on the top wall section of the track and movable along the length of the channel, and means for fastening the member at a desired position along the length of the channel;

said support means comprising a bracket having a first, generally horizontally disposed wall for engaging said track when attaching the track thereto, and a second downwardly depending wall that extends from the first wall, said second wall having said means for releasably attaching the support means to the roof of the vehicle;

said means for releasably attaching the support means to the roof of the vehicle comprising a hook element having a formation for releasably securing one end thereof to the second wall of the bracket and a finger portion at its other opposite end for engaging a gutter provided along a long side of the roof of the vehicle;

the second wall of the bracket having a peripheral edge seated within the gutter of the vehicle, a flange portion that extends generally perpendicularly from said second wall, and an aperture formed in said second wall between the flange portion and the peripheral edge; and the formation of the hook element having a threaded bore extending therethrough, and said means for releasably attaching the support means to the roof of the vehicle comprising a bolt fastener that extends through an opening formed in the flange portion of the second wall and is threadably received by the formation of the hook element for clamping the bracket to the gutter, said hook element extending through said aperture formed in the second wall of the bracket from one side of the second wall to its opposite side.

2. A vehicle roof rack for attachment to a roof of a vehicle, said roof rack comprising:

a track having an elongate tubular body comprising a thin wall which defines substantially the entire outer perimeter of the tubular body, said thin wall having a bottom wall section and a top wall section opposite the bottom wall section, said top wall section having an upwardly opening channel formed therein;

support means for supporting the track in an elevated position above the roof of the vehicle, said support means having means for releasably attaching the support means to the track and means for releasably attaching the support means to the roof of the vehicle;

a sliding fastening assembly releasably attachable to the upwardly opening channel of the top wall section of the track, said sliding fastening assembly comprising a member slidably mounted on the top wall section of the track and movable along the length of the channel, and means for fastening the member at a desired position along the length of the channel;

said support means comprising a bracket having a first, generally horizontally disposed wall for engaging said track when attaching the track thereto, and a second downwardly depending wall that extends from the first wall, said second wall having said means for releasably attaching the support means to the roof of the vehicle; and said bottom wall section of the track having a second shallow channel formed therein, said first wall of the bracket having an upwardly facing surface with a longitudinal rib formed therein, said rib being received in the second shallow channel of the track when disposing the track on the first wall of the bracket.

3. A vehicle roof rack as set forth in claim 2, said shallow channel being defined by a pair of shoulders formed in the bottom wall section of the track, and said rib being defined by a pair of shoulders formed in the first wall of the bracket, said shoulders of the rib being disposed between and engaging the shoulders of the bottom wall section of the track for preventing any relative lateral movement between the track and the bracket.

4. A vehicle roof rack for attachment to a roof of a vehicle, said roof rack comprising:

a track having an elongate body;

a sliding fastening assembly releasably attachable to the body of the track, said sliding fastening assembly comprising a member, means for slidably moving the member on the body of the track, and means for fastening the member at a desired position along the length of the body of the track;

support means for supporting the track in an elevated position above the roof of the vehicle, said support means comprising a bracket having a first, generally horizontally disposed wall for engaging said track when attaching the track thereto, and a second downwardly depending wall that extends from the first wall, said second wall having said means for releasably attaching the support means to the roof of the vehicle, said means for releasably attaching the support means to the roof of the vehicle comprising at least one hook element having a formation for releasably securing one end thereof to the second wall of the bracket and a finger portion at its other opposite end for engaging a gutter provided alone a long side of the roof of the vehicle, the second wall of the bracket having a peripheral edge seated within the gutter of the vehicle, a flange portion that extends generally perpendicularly from said second wall, and an aperture formed in said second wall between the flange portion and the peripheral edge, the formation of the hook element having a threaded bore extending therethrough, and said means for releasably attaching the support means to the roof of the vehicle comprising a bolt fastener that extends through an opening formed in the flange portion of the second wall and is threadably received by the formation of the hook element for clamping the bracket to the gutter, said hook element extending through said aperture formed in the second wall of the bracket from one side of the second wall to its opposite side.

* * * * *